(12) United States Patent
Shen

(10) Patent No.: US 11,960,423 B2
(45) Date of Patent: Apr. 16, 2024

(54) PCIE CONTROLLER AND LOOPBACK DATA PATH USING PCIE CONTROLLER

(71) Applicant: CHENGDU STARBLAZE TECHNOLOGY CO., LTD., Chengdu (CN)

(72) Inventor: Fei Shen, Chengdu (CN)

(73) Assignee: CHENGDU STARBLAZE TECHNOLOGY CO., LTD., Chengdu (CN)

( * ) Notice: Subject to any disclaimer, the term of this patent is extended or adjusted under 35 U.S.C. 154(b) by 140 days.

(21) Appl. No.: 17/455,314

(22) Filed: Nov. 17, 2021

(65) Prior Publication Data

US 2022/0075742 A1 Mar. 10, 2022

Related U.S. Application Data

(63) Continuation of application No. 16/651,844, filed as application No. PCT/CN2018/095335 on Jul. 11, 2018, now Pat. No. 11,210,247.

(30) Foreign Application Priority Data

Sep. 27, 2017 (CN) .......................... 201710886427.X
Sep. 27, 2017 (CN) .......................... 201710886573.2

(51) Int. Cl.
G06F 13/28 (2006.01)
G06F 12/0802 (2016.01)

(52) U.S. Cl.
CPC .......... *G06F 13/28* (2013.01); *G06F 12/0802* (2013.01); *G06F 2213/0026* (2013.01)

(58) Field of Classification Search
CPC ................ G06F 13/28; G06F 12/0802; G06F 2213/0026; H04L 9/0618; H04L 9/0631;
(Continued)

(56) References Cited

U.S. PATENT DOCUMENTS

| 5,343,461 A | 8/1994 | Barton et al. |
| 8,144,606 B1 * | 3/2012 | Viehweg ............. H04L 12/4625 |
| | | 709/224 |

(Continued)

FOREIGN PATENT DOCUMENTS

| CN | 101923512 | 12/2010 |
| CN | 103970634 | 8/2014 |

(Continued)

OTHER PUBLICATIONS

International search report dated Oct. 11, 2018 from corresponding application No. PCT/CN2018/095335.

(Continued)

*Primary Examiner* — Ilwoo Park
(74) *Attorney, Agent, or Firm* — HAUPTMAN HAM, LLP

(57) ABSTRACT

A PCIe controller and a loopback path using the PCIe controller. The PCIe controller includes: a transport layer transmission module, a transport layer reception module, a memory access module, and a memory, wherein the transport layer transmission module includes a first loopback control module, the transport layer reception module includes a second loopback control module, and the first loopback control module is coupled to the second loopback control module; the memory access module is coupled to the transport layer transmission module and the transport layer reception module, and the memory access module is also coupled to the memory.

16 Claims, 6 Drawing Sheets

(58) Field of Classification Search
CPC ... H04L 9/0637; H04L 9/0802; H04L 9/0805; H04L 9/0816
USPC .............. 380/26, 28, 30; 386/259; 700/32.6; 713/190, 191, 171; 725/31; 711/164
See application file for complete search history.

(56) References Cited

U.S. PATENT DOCUMENTS

| | | | |
|---|---|---|---|
| 8,761,031 | B2 | 6/2014 | Schoenborn et al. |
| 2008/0307276 | A1 | 12/2008 | Bodrozic et al. |
| 2009/0259857 | A1* | 10/2009 | Gehrmann .............. G06F 21/10 713/193 |
| 2010/0153799 | A1 | 6/2010 | Maroni et al. |
| 2015/0010218 | A1 | 1/2015 | Bayer |
| 2015/0058576 | A1 | 2/2015 | Galbraith et al. |
| 2018/0004701 | A1* | 1/2018 | Pappu ................. G06F 13/4282 |
| 2018/0359060 | A1* | 12/2018 | Kim ......................... H04L 1/244 |
| 2019/0187200 | A1 | 6/2019 | Gondi et al. |
| 2020/0233717 | A1* | 7/2020 | Smith ................... G06F 9/5044 |
| 2020/0244562 | A1 | 7/2020 | Paneah et al. |

FOREIGN PATENT DOCUMENTS

| | | |
|---|---|---|
| CN | 106569736 | 4/2017 |
| CN | 106843753 | 6/2017 |
| CN | 107643992 | 1/2018 |

OTHER PUBLICATIONS

Written Opinion dated Oct. 11, 2018 from corresponding application No. PCT/CN2018/095335.
Search Report dated Dec. 22, 2019 and English translation from corresponding application No. CN 201710886427.X.
NVM Express Workgroup, "NVM Express Specification Revision 1.2", NVM Express revision 1.2 specification available for download at http://nvmexpress.org. NVM Express revision 1.2 ratified on Nov. 3, 2014, total 204 pages.
Mukherjee et al.; "An Efficient Approach to Manage DMA Descriptors and Evalute PCIe-Based DMA Performance for ALICE Common Readout Unit (CRU)"; Advanced Detectors for Nuclear, Hight Energy and Astroparticle Physics, Springer Proceedings in Physics 201; 2018; p. 107-118.

* cited by examiner

PCIE CONTROLLER AND LOOPBACK DATA PATH USING PCIE CONTROLLER

CROSS REFERENCE TO RELATED APPLICATION

The present application is a Continuation of U.S. patent application Ser. No. 16/651,844, filed May 29, 2020, which is a National Phase of International Application Number PCT/CN2018/095335, filed Jul. 11, 2018, and claims the priority of Chinese Patent Application No. 201710886427.X, filed on Sep. 27, 2017, and entitled "PCIE CONTROLLER AND LOOPBACK DATA PATH USING PCIE CONTROLLER", and Chinese Patent Application No. 201710886573.2, filed on Sep. 27, 2017, and entitled "PCIE CONTROLLER AND KEY UPDATE USING PCIE CONTROLLER", the disclosures of which is hereby incorporated by reference herein in their entireties.

TECHNICAL FIELD

The present application relates to electronic devices, and specifically to provide an internal loopback data path by using the PCIe controller and to provide the password update through the internal loopback path.

BACKGROUND

The PCIe protocol defines an inter-device communication mechanism, and the NVMe protocol (also known as Chapter 3 of "NVM Express Revision 1.2" (hereinafter referred to as the NVMe protocol), Nov. 3, 2014) defines the mechanism of accessing the non-volatile storage device. The PCIe device provides the memory space, and the host coupled to the PCIe device can access the memory space of the PCIe device. The PCIe specification defines the loopback status. In the loopback status, the slave device (Slave) sends data received from the master device (Master) back to the master device.

According to loopback defined in the PCIe protocol, data is sent to the PCIe physical link and then returned from the link. However, in some cases, it is only necessary to establish the data path inside the PCIe controller by using the loopback function, without sending data to the physical link or returning the data from the PCIe controller of the slave device. However, there is no such method for establishing an internal loopback data path until now.

SUMMARY

The present application is intended to provide the PCIe controller supporting internal loopback, implement an internal loopback data path by using the provided PCIe controller, and update the data key by using the internal loopback data path.

According to the first aspect of the present application, the first PCIe controller according to the first aspect of the present application is provided, including: the transport layer transmission module, the transport layer reception module, the memory access module, and the memory, wherein the transport layer transmission module includes the first loopback control module, the transport layer reception module includes the second loopback control module, and the first loopback control module is coupled to the second loopback control module; the memory access module is coupled to the transport layer transmission module and the transport layer reception module, and the memory access module is further coupled to the memory.

According to the first PCIe controller of the first aspect of the present application, the second PCIe controller according to the first aspect of the present application is provided, further including the PCIe physical layer module, wherein the PCIe physical layer module is configured to process the PCIe physical layer protocol.

According to the first or second PCIe controller of the first aspect of the present application, the third PCIe controller according to the first aspect of the present application is provided, further including the data link layer module, wherein the data link layer module is configured to process the PCIe data link layer protocol.

According to one of the first to third PCIe controllers of the first aspect of the present application, the fourth PCIe controller according to the first aspect of the present application is provided, further including the outgoing DMA module and the receiving DMA module, wherein the outgoing DMA module is coupled to the memory and the transport layer transmission module, and the receiving DMA module is coupled to the memory and the transport layer reception module.

According to one of the first to fourth PCIe controllers of the first aspect of the present application, the fifth PCIe controller according to the first aspect of the present application is provided, further including the CPU sub-system, wherein the memory is coupled to the CPU sub-system.

According to one of the first to fifth PCIe controllers of the first aspect of the present application, the sixth PCIe controller according to the first aspect of the present application is provided, wherein the transport layer transmission module is configured to send the TLP.

According to one of the first to sixth PCIe controllers of the first aspect of the present application, the seventh PCIe controller according to the first aspect of the present application is provided, wherein the transport layer reception module is configured to receive the TLP.

According to one of the first to seventh PCIe controllers of the first aspect of the present application, the eighth PCIe controller according to the first aspect of the present application is provided, wherein the first loopback control module sends part of TLP to the second loopback control module.

According to the eighth PCIe controller of the first aspect of the present application, the ninth PCIe controller according to the first aspect of the present application is provided, wherein the first loopback control module sends the TLP with the specified identifier and/or the TLP accessing the specified address space to the second loopback control module.

According to one of the first to seventh PCIe controllers of the first aspect of the present application, the tenth PCIe controller according to the first aspect of the present application is provided, wherein the first loopback control module sends part of the data to the second loopback control module.

According to the tenth PCIe controller of the first aspect of the present application, the eleventh PCIe controller according to the first aspect of the present application is provided, wherein the first loopback control module sends the data with the specified identifier, and/or the specified address space access request, and/or the data associated with the specified address space to the second loopback control module.

According to the eighth or ninth PCIe controller of the first aspect of the present application, the twelfth PCIe controller according to the first aspect of the present application is provided, wherein the second loopback control module sends the TLP received by the first loopback control module to the memory access module or the receiving DMA module.

According to the tenth or eleventh PCIe controller of the first aspect of the present application, the thirteenth PCIe controller according to the first aspect of the present application is provided, wherein the second loopback control module sends the data received by the first loopback control module to the memory access module or the receiving DMA module.

According to one of the first to thirteenth PCIe controllers of the first aspect of the present application, the fourteenth PCIe controller according to the first aspect of the present application is provided, wherein the memory access module is configured to process the TLP accessing the memory space of the PCIe device.

According to one of the first to fourteenth PCIe controllers of the first aspect of the present application, the fifteenth PCIe controller according to the first aspect of the present application is provided, wherein the memory access module provides the memory access result via the transport layer transmission module.

According to one of the first to fifteenth PCIe controllers of the first aspect of the present application, the sixteenth PCIe controller according to the first aspect of the present application is provided, wherein part of memory access results sent by the memory access module to the transport layer transmission module is forwarded to the transport layer reception module by the first loopback control module.

According to one of the first to sixteenth PCIe controllers of the first aspect of the present application, the seventeenth PCIe controller according to the first aspect of the present application is provided, wherein the transport layer reception module receives the TLP accessing the memory space of the PCIe device, and sends it to the memory access module, and the memory access module accesses the memory according to the TLP.

According to one of the first to seventeenth PCIe controllers of the first aspect of the present application, the eighteenth PCIe controller according to the first aspect of the present application is provided, wherein the CPU sub-system fills the memory with the DMA command.

According to one of the first to eighteenth PCIe controllers of the first aspect of the present application, the nineteenth PCIe controller according to the first aspect of the present application is provided, wherein the outgoing DMA module is configured to initiate DMA transmission.

According to one of the first to nineteenth PCIe controllers of the first aspect of the present application, the twentieth PCIe controller according to the first aspect of the present application is provided, wherein the outgoing DMA module obtains the DMA command from the memory, and transmits the specified data in the memory or in DRAM coupled to the PCIe controller to the specified address according to the DMA command.

According to one of the first to twentieth PCIe controllers of the first aspect of the present application, the twenty-first PCIe controller according to the first aspect of the present application is provided, wherein the outgoing DMA module sends data via the transport layer transmission module.

According to one of the first to eighteenth PCIe controllers of the first aspect of the present application, the twenty-second PCIe controller according to the first aspect of the present application is provided, wherein the receiving DMA module is configured to receive the data transmitted in the DMA manner.

According to the twenty-second PCIe controller of the first aspect of the present application, the twenty-third PCIe controller according to the first aspect of the present application is provided, wherein the receiving DMA module obtains the DMA command from the memory, obtains the data from the specified address of the host or the PCIe device according to the DMA command, and writes the data to the memory or DRAM.

According to the second aspect of the present application, the first method for sending data according to the second aspect of the present application is provided, including: generating, by the CPU sub-system, the DMA command, and providing it to the outgoing DMA module; obtaining, by the outgoing DMA module, the data to be transmitted from DRAM according to the instruction of the DMA command; sending, by the outgoing DMA module, the data obtained from DRAM and the destination address of the DMA transmission to the transport layer transmission module; sending, by the transport layer transmission module, the data and the destination address to the second loopback control module of the transport layer reception module via the first loopback control module; and writing, by the transport layer reception module, the data to the memory via the memory access module according to the received data and the destination address.

According to the first method for sending data of the second aspect of the present application, the second method for sending data according to the second aspect of the present application is provided, wherein indicating, by the DMA command, the source address and the destination address in DRAM.

According to the first or second method for sending data of the second aspect of the present application, the third method for sending data according to the second aspect of the present application is provided, including: in response to writing data to the memory, further generating, by the memory access module, the acknowledgment message, and providing the acknowledgement message to the transport layer transmission module.

According to the third method for sending data of the second aspect of the present application, the fourth method for sending data according to the second aspect of the present application is provided, including: sending, by the transport layer transmission module, the acknowledge message to the second loopback control module of the transport layer reception module by using the first loopback control module according to the destination address of the acknowledgment message.

According to the third or fourth method for sending data of the second aspect of the present application, the fifth method for sending data according to the second aspect of the present application is provided, including: in response to receiving the acknowledgment message, providing, by the transport layer reception module, the acknowledgment message to the outgoing DMA module.

According to one of the first to fifth methods for sending data of the second aspect of the present application, the sixth method for sending data according to the second aspect of the present application is provided, including: updating, by the outgoing DMA module, the DMA command in the memory, according to the DMA command execution result.

According to one of the third to sixth methods for sending data of the second aspect of the present application, the seventh method for sending data according to the second aspect of the present application is provided, including: packaging, by the transport layer transmission module, the acknowledgment message as the TLP, and using the first loopback control module sends the TLP to the second loopback control module of the transport layer reception module, receiving, by the transport layer reception module, the TLP from the second loopback control module and parsing the TLP to identify it as the acknowledgment message.

According to one of the first to seventh methods of sending data of the second aspect of the present application, the eighth method for sending data according to the second aspect of the present application is provided, wherein transmitting, by the first loopback control module of the transport layer transmission module and the second loopback control module of the transport layer reception module, the data and/or the address according to the self-defined protocol.

According to the third aspect of the present application, the first method for obtaining data according to the third aspect of the present application is provided, including: generates, by the CPU sub-system, the DMA command, and providing it to the receiving DMA module; issuing, by the receiving DMA module, the data access request via the transport layer transmission module according to the instruction of the DMA command; sending, by the transport layer transmission module, the data access request to the second loopback control module of the transport layer reception module by using the first loopback control module; accessing, by the transport layer reception module, the memory via the memory access module according to the received data access request to obtain the data to be accessed; sending, by the transport layer transmission module, the memory access result to the second loopback control module of the transport layer reception module by using the first loopback control module; receiving, by the transport layer reception module, the memory access result, and providing the memory access result to the receiving DMA module; and writing, by the receiving DMA module, the memory access result to the memory or DRAM.

According to the first method for obtaining data of the third aspect of the present application, the second method for obtaining data according to the third aspect of the present application is provided, wherein indicating, by the DMA command, the source address and the destination address in DRAM.

According to the first or second method for obtaining data of the third aspect of the present application, the third method for obtaining data according to the third aspect of the present application is provided, including: in response to writing the data to the memory or DRAM, further generating, by the receiving DMA module, the DMA command execution result, and updating the DMA command in the memory according to the DMA command execution result.

According to the first or second method for obtaining data of the third aspect of the present application, the fourth method for obtaining data according to the third aspect of the present application is provided, including: further generating, by the receiving DMA module, the DMA command execution result in response to writing the data to DRAM, and writing the DMA command execution result to the memory, to indicate the completion of DMA command execution to the CPU sub-system.

According to one of the first to fourth methods for obtaining data of the third aspect of the present application, the fifth method for obtaining data according to the third aspect of the present application is provided, including: identifying, by the transport layer transmission module, the destination address is mapped to the transport layer reception module, according to the destination address of the received data access request.

According to one of the first to fifth methods for obtaining data of the third aspect of the present application, the sixth method for obtaining data according to the third aspect of the present application is provided, including: packaging, by the transport layer transmission module, the memory access result as the TLP, and sending the TLP to the second loopback control module of the transport layer reception module by using the first loopback control module, and receiving, by the transport layer reception module, the TLP from the second loopback control module and parsing the TLP to identify it as the memory access result.

According to one of the first to sixth methods for obtaining data of the third aspect of the present application, the seventh method for obtaining data according to the third aspect of the present application is provided, wherein transmitting, by the first loopback control module of the transport layer transmission module and the second loopback control module of the transport layer reception module, the data and/or the address according to the self-defined protocol.

According to one of the first to seventh methods for obtaining data of the third aspect of the present application, the eighth method for obtaining data according to the third aspect of the present application is provided, including obtaining, by the memory access module, the memory access result from the memory, and identifying that the memory access result should be submitted to the transport layer reception module, according to the source address.

According to the fourth aspect of the present application, the first PCIe controller according to the fourth aspect of the present application is provided, including: the transport layer transmission module, the transport layer reception module, the memory access module, the outgoing DMA module, the receiving DMA module, the encryption module, the decryption module, and the memory; wherein the transport layer transmission module includes the first loopback control module, the transport layer reception module includes the second loopback control module, and the first loopback control module is coupled to the second loopback control module; the memory access module is coupled to the transport layer transmission module and the transport layer reception module, and the memory access module is further coupled to the memory; the outgoing DMA module is coupled to the decryption module, and the outgoing DMA module is also coupled to the transport layer transmission module; the receiving DMA module is coupled to the encryption module, and the receiving DMA module is also coupled to the transport layer reception module; and the encryption module and the decryption module are also coupled to DRAM outside the PCIe controller, separately.

According to the first PCIe controller of the fourth aspect of the present application, the second PCIe controller according to the fourth aspect of the present application is provided, further including the PCIe physical layer module, wherein the PCIe physical layer module is configured to process the PCIe physical layer protocol.

According to the first or second PCIe controller of the fourth aspect of the present application, the third PCIe controller according to the fourth aspect of the present application is provided, further including the data link layer module, wherein the data link layer module is configured to process the PCIe data link layer protocol.

According to the third PCIe controller of the fourth aspect of the present application, the fourth PCIe controller according to the fourth aspect of the present application is provided, wherein the encryption module is integrated inside the receiving DMA module, and the decryption module is integrated inside the outgoing DMA module.

According to one of the first to fourth PCIe controllers of the fourth aspect of the present application, the fifth PCIe controller according to the fourth aspect of the present application is provided, wherein the encryption module is configured to encrypt the data provided by the receiving DMA module, and provide the encrypted data to DRAM.

According to one of the first to fifth PCIe controllers of the fourth aspect of the present application, the sixth PCIe controller according to the fourth aspect of the present application is provided, wherein the decryption module is configured to decrypt the data obtained from DRAM, and provide the decrypted data to the outgoing DMA module.

According to one of the first to sixth PCIe controllers of the fourth aspect of the present application, the seventh PCIe controller according to the fourth aspect of the present application is provided, further including the CPU subsystem, wherein the memory is coupled to the CPU subsystem.

According to one of the first to seventh PCIe controllers of the fourth aspect of the present application, the eighth PCIe controller according to the fourth aspect of the present application is provided, wherein the transport layer transmission module is configured to send the TLP.

According to one of the first to eighth PCIe controllers of the fourth aspect of the present application, the ninth PCIe controller according to the fourth aspect of the present application is provided, wherein the transport layer reception module is configured to receive the TLP.

According to one of the first to ninth PCIe controllers of the fourth aspect of the present application, the tenth PCIe controller according to the fourth aspect of the present application is provided, wherein the first loopback control module sends part of TLPs to the second loopback control module.

According to the tenth PCIe controller of the fourth aspect of the present application, the eleventh PCIe controller according to the fourth aspect of the present application is provided, wherein the first loopback control module sends the TLP with the specified identifier and/or the TLP accessing the specified address space to the second loopback control module.

According to one of the first to eleventh PCIe controllers of the fourth aspect of the present application, the twelfth PCIe controller according to the fourth aspect of the present application is provided, wherein the first loopback control module sends part of the data to the second loopback control module.

According to the twelfth PCIe controller of the fourth aspect of the present application, the thirteenth PCIe controller according to the fourth aspect of the present application is provided, wherein the first loopback control module sends the data with the specified identifier, and/or the specified address space access request, and/or the data associated with the specified address space to the second loopback control module.

According to the tenth or eleventh PCIe controller of the fourth aspect of the present application, the fourteenth PCIe controller according to the fourth aspect of the present application is provided, wherein the second loopback control module sends the TLP received by the first loopback control module to the memory access module or the receiving DMA module.

According to the thirteenth or fourteenth PCIe controller of the fourth aspect of the present application, the fifteenth PCIe controller according to the fourth aspect of the present application is provided, wherein the second loopback control module sends the data received by the first loopback control module to the memory access module or the receiving DMA module.

According to one of the first to fifteenth PCIe controllers of the fourth aspect of the present application, the sixteenth PCIe controller according to the fourth aspect of the present application is provided, wherein the memory access module is configured to process the TLP accessing the memory space of the PCIe device.

According to one of the first to sixteenth PCIe controllers of the fourth aspect of the present application, the seventeenth PCIe controller according to the fourth aspect of the present application is provided, wherein the memory access module provides the memory access result via the transport layer transmission module.

According to one of the first to seventeenth PCIe controllers of the fourth aspect of the present application, the eighteenth PCIe controller according to the fourth aspect of the present application is provided, wherein part of memory access results sent by the memory access module to the transport layer transmission module is forwarded to the transport layer reception module by the first loopback control module.

According to one of the first to eighteenth PCIe controllers of the fourth aspect of the present application, the nineteenth PCIe controller according to the fourth aspect of the present application is provided, wherein the transport layer reception module receives the TLP accessing the memory space of the PCIe device, and sends it to the memory access module, and the memory access module accesses the memory according to the TLP.

According to one of the first to nineteenth PCIe controllers of the fourth aspect of the present application, the twentieth PCIe controller according to the fourth aspect of the present application is provided, wherein the CPU subsystem fills the memory with the DMA command.

According to one of the first to twentieth PCIe controllers of the fourth aspect of the present application, the twenty-first PCIe controller according to the fourth aspect of the present application is provided, wherein the outgoing DMA module is configured to initiate DMA transmission.

According to one of the first to twenty-first PCIe controllers of the fourth aspect of the present application, the twenty-second PCIe controller according to the fourth aspect of the present application is provided, wherein the outgoing DMA module obtains the DMA command from the memory, and according to the DMA command transmits the specified data in the memory or in DRAM coupled to the PCIe controller to the specified address.

According to one of the first to twenty-second PCIe controllers of the fourth aspect of the present application, the twenty-third PCIe controller according to the fourth aspect of the present application is provided, wherein the outgoing DMA module sends data via the transport layer transmission module.

According to one of the first to twenty-third PCIe controllers of the fourth aspect of the present application, the twenty-fourth PCIe controller according to the fourth aspect of the present application is provided, wherein the receiving DMA module is configured to receive the data transmitted in the DMA manner.

According to the twenty-fourth PCIe controller of the fourth aspect of the present application, the twenty-fifth PCIe controller according to the fourth aspect of the present application is provided, wherein the receiving DMA module obtains the DMA command from the memory, according to the DMA command obtains data from the specified address of the host or the PCIe device, and writes the data to the memory or DRAM.

According to the fifth aspect of the present application, the first method for processing the key update command according to the fifth aspect of the present application is provided, including: in response to the key update command, reading data from the logical address indicated by the key update command, and caching the read data in the first address; initiating the outgoing DMA transmission to move the data from the first address to the second address, and decrypting the read data with the old key during the transfer process; initiating the receiving DMA transmission to move the data from the second address to the third address, and encrypting the read data by using the new key during the transfer process; and writing the data encrypted in the third address by using the new key to the logical address.

According to the sixth aspect of the present application, the first method for updating the data key according to the sixth aspect of the present application is provided, including: receiving the key update command; generating the outgoing DMA command according to the key update command; decrypting cipher text data by using the first key to obtain plaintext data; caching the plaintext data in the solid-state storage device through the loopback path; in response to the completion of outgoing DMA command processing, generating the receiving DMA command; encrypting the cached plaintext data by using the second key; and writing the encrypted data into the solid-state storage device.

According to the first method for updating the data key of the sixth aspect of the present application, the second method for updating the data key according to the sixth aspect of the present application is provided, wherein indicating, by the key update command, the new key to be used and the storage address of data of the key to be updated.

According to the first or second method for updating the data key of the sixth aspect of the present application, the third method for updating the data key according to the sixth aspect of the present application is provided, wherein the storage address is the logical address of the solid-state storage device, or the physical address provided by the solid-state storage device for the user.

According to one of the first to third methods for updating the data key of the sixth aspect of the present application, the fourth method for updating the data key according to the sixth aspect of the present application is provided, including: reading data from the NVM chip of the solid-state storage device according to the storage address indicated by the key update command, and storing the data in the cached first address.

According to the fourth method for updating the data key of the sixth aspect of the present application, the fifth method for updating the data key according to the sixth aspect of the present application is provided, wherein the data stored in the cached first address is the cipher text data encrypted by using the first key.

According to one of the first to fifth methods for updating the data key of the sixth aspect of the present application, the sixth method for updating the data key according to the sixth aspect of the present application is provided, including: transmitting the cipher text data in the cached first address to the cached second address according to the outgoing DMA command, wherein the cached second address stores the plaintext data.

According to one of the first to sixth methods for updating the data key of the sixth aspect of the present application, the seventh method for updating the data key according to the sixth aspect of the present application is provided, including: in the process of transmitting the cipher text data in the cached first address to the cached second address according to the outgoing DMA command, the first password is used to decrypt the cipher text data to obtain the plaintext data.

According to the sixth or seventh method for updating the data key of the sixth aspect of the present application, the eighth method for updating the data key according to the sixth aspect of the present application is provided, wherein the outgoing DMA module sends the plaintext data to the transport layer transmission module; the transport layer transmission module sends the plaintext data to the second loopback control module via the first loopback control module according to the destination address of DMA transmission; and the transport layer reception module provides the plaintext data received by the second loopback control module to the cache.

According to one of the first to eighth methods for updating the data key of the sixth aspect of the present application, the ninth method for updating the data key according to the sixth aspect of the present application is provided, wherein the cache is the memory of the PCIe controller or DRAM coupled to the PCIe controller.

According to one of the first to ninth methods for updating the data key of the sixth aspect of the present application, the tenth method for updating the data key according to the sixth aspect of the present application is provided, including: transmitting the plaintext data in the cached second address to the cached third address according to the receiving DMA command, wherein the cached third address stores the cipher text data encrypted by the second key to the plaintext data.

According to one of the first to tenth methods for updating the data key of the sixth aspect of the present application, the eleventh method for updating the data key according to the sixth aspect of the present application is provided, including: in the process of transmitting the plaintext data in the cached second address to the cached third address according to the receiving DMA command, encrypting the plaintext data by using the second password to obtain the cipher text data.

According to the tenth or eleventh method for updating the data key of the sixth aspect of the present application, the twelfth method for updating the data key according to the sixth aspect of the present application is provided, wherein the receiving DMA module requests to obtain the plaintext data in the cached second address; the transport layer transmission module sends the plaintext data to the second loopback control module via the first loopback control module according to the destination address of the DMA transmission; the transport layer reception module provides the plaintext data received by the second loopback control module to the receiving DMA module; and the receiving DMA module encrypts the plaintext data by using the second key to obtain the cipher text data, and stores the cipher text data in the cached third address.

According to one of the first to twelfth methods for updating the data key of the sixth aspect of the present application, the thirteenth method for updating the data key according to the sixth aspect of the present application is provided, including: indicating the completion of key update command processing.

According to one of the first to thirteenth methods for updating the data key of the sixth aspect of the present application, the fourteenth method for updating the data key according to the sixth aspect of the present application is provided, including: after writing the cipher text data encrypted by using the second key to the cached third address, indicating the completion of the key update command processing.

According to the seventh aspect of the present application, the first method for processing the key update command according to the seventh aspect of the present application is provided, including: in response to the key update command, reading the data from the logical address indicated by the key update command, and the data read in cached first address; initiating the outgoing DMA transmission to move the data from the first address to the second address, and in the transfer process, decrypting the read data by using the old key to obtain plaintext data and encrypting the plaintext data by using the new key to obtain cipher text data; and writing the cipher text data at the second address to the logical address.

According to the first method for processing the key update command of the seventh aspect of the present application, the second method for processing the key update command according to the seventh aspect of the present application is provided, wherein the outgoing DMA module sends the plaintext data to the transport layer transmission module; the transport layer transmission module sends the plaintext data to the second loopback control module via the first loopback control module according to the destination address of the DMA transmission; the transport layer reception module provides the plaintext data received by the second loopback control module to the memory access module; and the memory access module stores the cipher text data in the cached second address.

According to the eighth aspect of the present application, the first method for processing the key update command according to the eighth aspect of the present application is provided, including: in response to the key update command, reading the data from the logical address indicated by the key update command, and the data read in the cached first address; initiating the receiving DMA transmission to move the data from the first address to the second address, and in the transfer process, decrypting the read data with the old key to obtain plaintext data and encrypting the plaintext data by using the new key to obtain cipher text data; and writing the cipher text data at the second address to the logical address.

According to the first method for processing the key update command of the eighth aspect of the present application, the second method for processing the key update command according to the eighth aspect of the present application is provided, including: the receiving DMA module requests to obtain the cipher text data in the cached first address via the transport layer transmission module; the transport layer transmission module sends the request to the second loopback control module via the first loopback control module according to the source address of the DMA transmission; the transport layer reception module provides the request received by the second loopback control module to the memory access module; the memory access module obtains the cipher text data from the cached first address, and provides the plaintext data decrypted by using the first key to the transport layer transmission module; the transport layer transmission module sends the request to the second loopback control module via the first loopback control module according to the destination address of the DMA transmission; the transport layer reception module provides the plaintext data received by the second loopback control module to the receiving DMA module; and the receiving DMA module encrypts the plaintext data by using the second key to obtain the cipher text data, and stores the cipher text data to the third address.

According to the ninth aspect of the present application, the program including the program code is provided, wherein when loaded into the storage device and executed on the storage device, the program code enables the storage device to implement one of the methods according to the second, third, fifth, sixth, seventh, and eighth aspects of the present application.

The technical solution of the present application has the following advantages: the loopback mechanism inside the PCIe controller is provided, and the host end of the DMA transmission can be replaced by the storage space or DRAM inside the PCIe controller, so as to achieve memory/DRAM to the DMA transmission of memory/DRAM; and the key update is completed without host intervention.

BRIEF DESCRIPTION OF THE DRAWINGS

To describe the technical solutions in examples of the present application or in the prior art more clearly, the accompanying drawings required for describing the examples or the prior art are briefly introduced below. Apparently, the accompanying drawings in the following description show merely some examples recited in the present application, and the person of ordinary skill in the art can still derive other accompanying drawings from these accompanying drawings.

DESCRIPTION OF EMBODIMENTS

The technical solutions in examples of the present application are clearly and fully described below with reference to the drawings in the examples of the present application. Apparently, the described examples are merely some of the examples of the present application, but not all the examples. Based on the examples of the present application, all other examples obtained by the person of ordinary skill in the art without involving an inventive effort shall fall within the protection scope of the present application.

Figure 1:
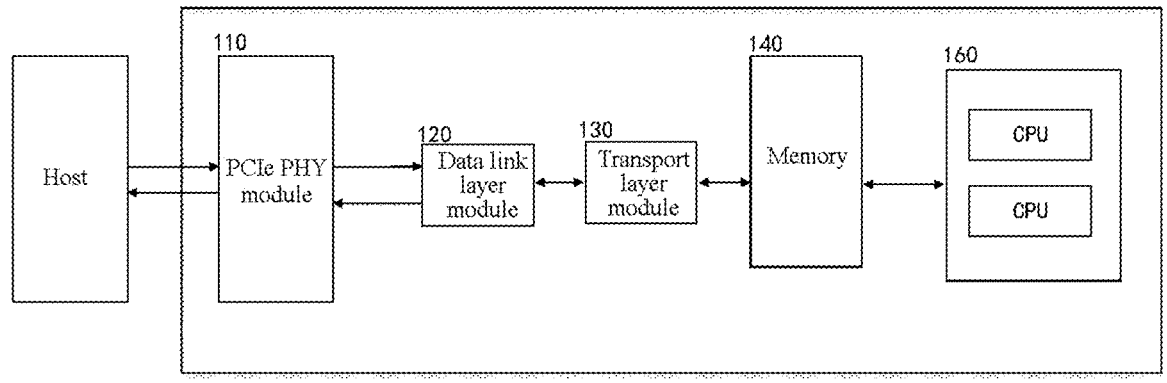
FIG. 1 shows the block diagram of the circuit system of the PCIe controller.

FIG. 1 shows the block diagram of the circuit system of the PCIe controller. As shown in FIG. 1, the host is coupled to the device via the PCIe PHY module 110. The PCIe controller includes the PCIe PHY module 110, the data link layer module 120, the transport layer module 130, the memory 140, and the CPU sub-system 160. The CPU sub-system 160 includes one or more CPUs. The PCIe PHY module 110 is configured to process the PCIe underlying protocol (such as the physical layer). The transport layer module 130 and the CPU sub-system 160 both can access the memory 140. The data link layer module 120 is configured to process the PCIe data link layer protocol, and the transport layer module 130 is configured to process the PCIe transport layer protocol. The transport layer module 130 further accesses the memory 140 according to the TLP (Transport Layer Packet) of the memory space. Optionally, the transport layer module 130 writes the TLP to the memory 140, the CPU sub-system 160 extracts the TLP from the memory 140 and processes the TLP, and the transport layer module 130 obtains the TLP from the memory 140 and sends the TLP to the host via the data link layer module 120. Still optionally, the transport layer module 130 sends the TLP to the CPU sub-system 160, and the CPU sub-system 160 processes the TLP.

Optionally, the transport layer module 130 further assists in processing the access request of the NVMe protocol, for example, converting the request sent by the host to access the specific area of the memory space of the device into the controller register access request including the access type, the memory space address, and/or data to be written, and accessing the memory 140 or forwarding to the CPU sub-system 160 for processing.

In NVMe protocol Revision 1.2, PCIe registers MLBAR and MUBAR define the memory space for providing the NVMe controller register, and the lower 4 KB of the address space is used for the attribute/control register.

When accessing the doorbell register or the device vendor specific register, the transport layer module 130 writes the access request to the storage location of the memory 140 corresponding to the memory space address according to the memory space address, or reads data from the storage location corresponding to the memory space address of the memory and returns the data to the host via the data link layer module 120 (and the PCIe PHY module 110).

When the controller register access request of the NVMe protocol sent by the host is to access the attribute/control register, the transport layer module 130 generates the register access message and inserts the register access message into the message queue in the memory. When one or more CPUs in the CPU sub-system 160 find that there is the message to be processed in the message queue of the memory 140, the message is taken out, the attribute/control register to be accessed and the type of access are determined, the register access message is processed, and the access result is returned to the host via the transport layer module 130. In one example, the CPU sub-system 160 adds the access result to the message queue in the memory 140, and the transport layer module 130 takes the access result from the message queue and returns it to the host via the data link layer module 120.

In this way, various controller registers in the NVMe protocol are implemented, and effective processing is performed for different types of the controller registers, access constraints, etc. Moreover, after the NVMe protocol is updated, it is possible to efficiently adapt the modification of the access to the controller register introduced in the new protocol by modifying the program running in the CPU subsystem 160.

Figure 2A:
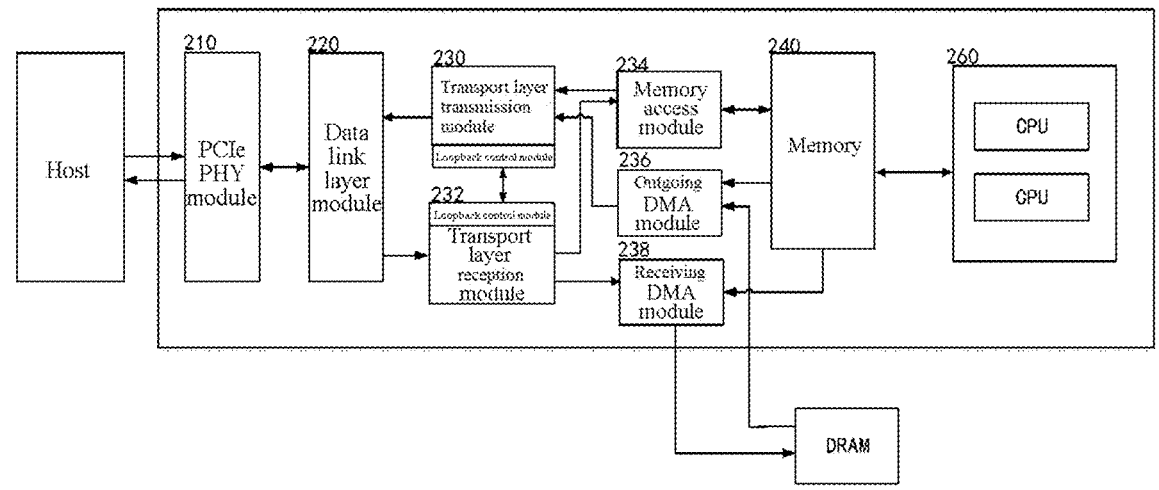
FIG. 2A shows the block diagram of the PCIe controller according to an example of the present application.

FIG. 2A shows the block diagram of the PCIe controller according to an example of the present application. The PCIe controller according to the example shown in FIG. 2A includes the PCIe PHY module 210, the data link layer module 220, the transport layer transmission module 230, the transport layer reception module 232, the memory access module 234, the outgoing DMA module 236, the receiving DMA module 238, the memory 240, and the CPU sub-system 260.

The PCIe PHY module 210 is configured to process the PCIe underlying protocol (such as the physical layer). The PCIe PHY module 210 is coupled to the host (or other PCIe devices, including the endpoint, the root complex, and the switch) and the data link layer module 220. The data link layer module 220 is configured to process the PCIe data link layer protocol. The data link layer module 220 is coupled to the transport layer transmission module 230 and the transport layer reception module 232. The transport layer transmission module 230 is configured to send the TLP to the host via the data link layer module 220, and the transport layer reception module 232 is configured to receive the TLP from the data link layer module 220.

In an example of the present application, the transport layer transmission module 230 further includes the loopback control module, and the transport layer reception module 232 also includes the loopback control module. In one example, the transport layer transmission module 230 sends the part of TLP (such as TLP with the specified identifier and/or TLP accessing the specified address space) to the loopback control module of the transport layer reception module 232 via its loopback control module, instead of sending to the data link layer module 220. In yet another example, the transport layer transmission module 230 sends part of data (such as data with the specified identifier, and/or the specified address space access request, and/or data associated the specified address space) to the loopback control module of the transport layer reception module 232 via its loopback control module, instead of being packaged into the TLP and sent to the data link layer module 220. Therefore, the loopback path is formed on the data link layer of the PCIe protocol and even on the transport layer.

The PCIe controller further includes the memory access module 234, the outgoing DMA module 236, and the receiving DMA module 238. The memory access module 234 is configured to process the TLP accessing the memory space of the PCIe device. The memory access module 234 is coupled with the transport layer transmission module 230, and provides the memory access result to the host (or the PCIe device) via the transport layer transmission module 230. Because the loopback path is provided in the example of the present application, part of the memory access result sent by the memory access module 234 to the transport layer transmission module 230 is forwarded to the transport layer reception module 232 through the loopback path. The memory access module 234 is also coupled with the transport layer reception module 232. The TLP issued by the host (or the PCIe device) to access the memory space is sent to the memory access module 234 by the transport layer reception module 232, and the memory access module 234 generates the memory access result according to the TLP (by accessing the memory 240 or processed by the CPU sub-system 260).

The outgoing DMA module 236 is configured to process the DMA transmission from the PCIe controller to the host (or the PCIe device). The outgoing DMA module 236 is coupled to the memory 240 and DRAM, and transmits the data in the memory 240 or DRAM to the host in the DMA manner. Optionally, the CPU sub-system 260 fills the memory 240 with the DMA command. The outgoing DMA module 236 obtains the DMA command from the memory 240, and transmits the specified data in the memory 240 or DRAM to the specified address of the host according to the DMA command. The outgoing DMA module 236 is coupled to the transport layer transmission module 230, and sends the data to the host via the transport layer transmission module 230.

The receiving DMA module 238 is configured to process the DMA transmission from the host (or the PCIe device) to the PCIe controller. The receiving DMA module 238 is coupled to the memory 240 and DRAM. The CPU sub-system 260 fills the memory 240 with the DMA command. The receiving DMA module 238 obtains the DMA command from the memory 240, obtains data from the specified address of the host (or the PCIe device) according to the DMA command, and writes the data to the memory 240 or DRAM. The receiving DMA module 238 is also coupled to the transport layer transmission module 230 (not shown in FIG. 2), and sends the data access request for initiating the DMA transmission to the host via the transport layer transmission module 230, and the receiving DMA module 238 receives data provided by the host from the transport layer reception module 232.

Optionally, DRAM is the memory external to the PCIe controller chip, or DRAM and the PCIe controller are integrated in the same chip.

The outgoing DMA module 236 is also called "Engress DMA" or "Scatter DMA". The receiving DMA module 238 is also called "Ingress DMA" or "Gather DMA".

According to the examples of the present application, because the loopback path is provided, the host end of the DMA transmission can be replaced by the storage space or DRAM inside the PCIe controller, so as to achieve the DMA transmission from memory 240/DRAM to memory 240/DRAM. For example, the outgoing DMA module 236 sends data via the transport layer module 230; by providing the special identifier or the specified address space, the transport layer transmission module 230 forwards the data provided by the outgoing DMA module 236 to the loopback control module of the transport layer reception module 232 via its loopback control module; and the transport layer reception module 232 provides the data to the memory access module 234/the receiving DMA module 238, to write the data to the memory 240/DRAM.

Figure 2B:
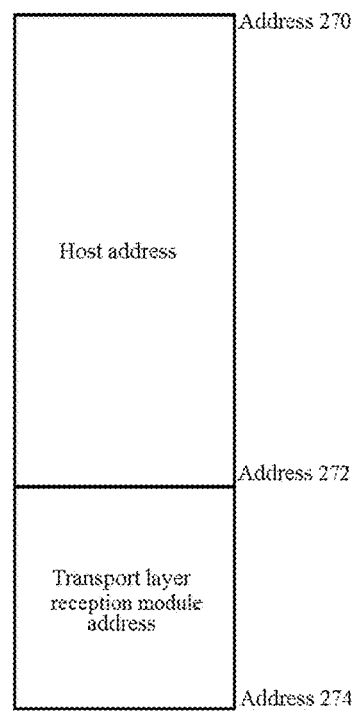
FIG. 2B shows an address mapping table of the transport layer transmission module according to an example of the present application.

FIG. 2B shows an address mapping table of the transport layer transmission module according to an example of the present application.

As one embodiment, the transport layer transmission module 230 (refer to FIG. 2A) maintains an address mapping table shown in FIG. 2B. Through the address mapping table, the portion that originally indicated the address space of the destination end (host or PCIe device) is mapped to the transport layer reception module 232. In FIG. 2B, the range from address 270 to address 272 is mapped to the host (or the PCIe device), and the transport layer transmission module 230 sends the TLP or access request to access address 270 to address 272 to the host (or the PCIe device) via the data link layer 220. In FIG. 2B, the range from address 272 to address 274 is mapped to the transport layer reception module 232, and the transport layer transmission module 230 sends the TLP or access request to access address 272 to address 274 to the loopback control module of the transport layer module 232 via its own loopback control module.

As an example, only the address 272 is recorded, the TLP or access request with the accessed address less than address 272 is sent to the host, and the TLP or access request with the accessed address greater than address 272 is sent to the transport layer reception module 232.

Figure 3:
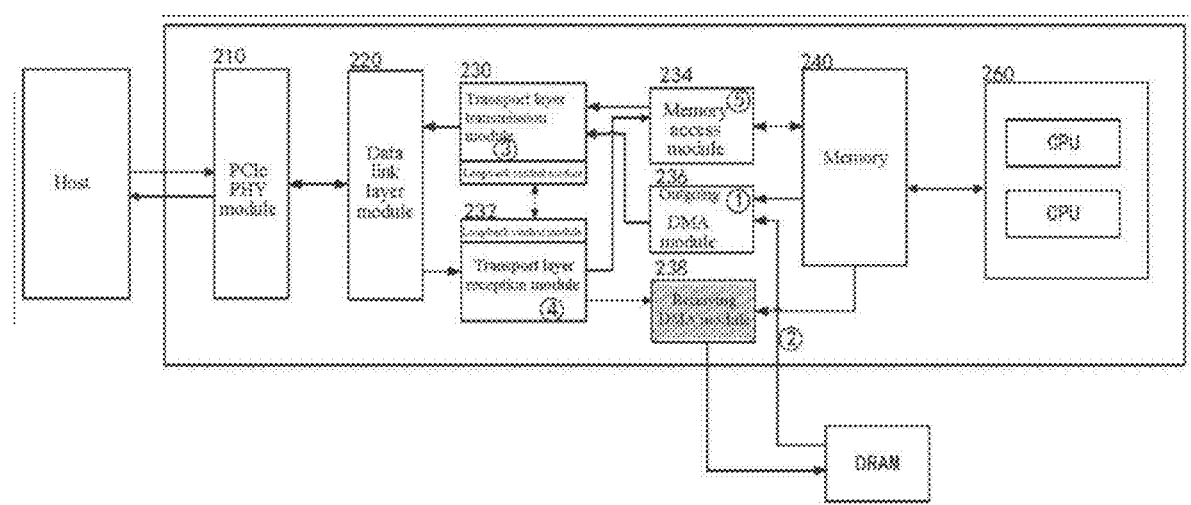
FIG. 3 is the schematic diagram of the PCIe controller "sending" data through the loopback path according to an example of the present application.

FIG. 3 is the schematic diagram of a PCIe controller "sending" data through the loopback path according to an example of the present application. As an example, the example of FIG. 3 shows the process of "sending" DRAM data from the PCIe controller to the destination storage space in the memory 240.

In order to send data, the CPU sub-system 260 generates the DMA command, and fills the memory 240. The outgoing DMA module 236 polls the memory 240 to promptly find and obtain the DMA command to be processed (indicated by ①). The DMA command indicates the source address and the destination address in DRAM. As an example, from the perspective of the outgoing DMA module 236, the destination address is the address in the host (or the remote PCIe device).

The outgoing DMA module 236 obtains data to be transmitted from DRAM according to the instruction of the DMA command (indicated by ②).

The outgoing DMA module 236 sends the data obtained from DRAM and the destination address of the DMA transmission to the transport layer transmission module 230 (indicated by ③). The transport layer transmission module 230 identifies the destination address is mapped to the transport layer reception module according to the received destination address, so that the transport layer transmission module 230 through the loopback path, uses its own loopback control module to transmit data and address to the loopback control module of the transport layer reception module 232 (indicated by ④).

The transport layer reception module 232 writes the data to the location corresponding to the destination address in the memory 240 via the memory access module 234 according to the received destination address and data (indicated by ⑤).

Therefore, the process of "sending" the data in DRAM to the destination address in the memory 240 is completed.

Optionally, the memory access module 234 further generates the acknowledgment message in response to writing the data to the memory 240, and provides the acknowledgment message to the transport layer transmission module 230, to provide the DMA transmission result to the initiator of DMA transmission. The transport layer transmission module 230 identifies that the acknowledgment message is to be sent to the loopback control module of the transport layer reception module 232 through the loopback path, according to the destination address of the acknowledgement message. The transport layer reception module 232 receives the acknowledgment message, and provides the acknowledgment message to the outgoing DMA module 236. The outgoing DMA module 236 updates the DMA command in the memory 240 according to the DMA command execution result, or writes the DMA command execution result to the memory 240, to indicate to the CPU sub-system 260 that the DMA command execution is completed.

Optionally, the transport layer transmission module 230 packages the acknowledgment message as the TLP, and the transport layer reception module 232 receives the TLP from the loopback path and parses the TLP to identify it as the acknowledgment message. Still optionally, the loopback control module of the transport layer transmission module 230 and the loopback control module of the transport layer reception module 232 transmit data and/or address according to the self-defined protocol.

In the example according to FIG. 3, the process of "sending" the data through the loopback path does not use the receiving DMA module 238, which the shaded.

Figure 4:
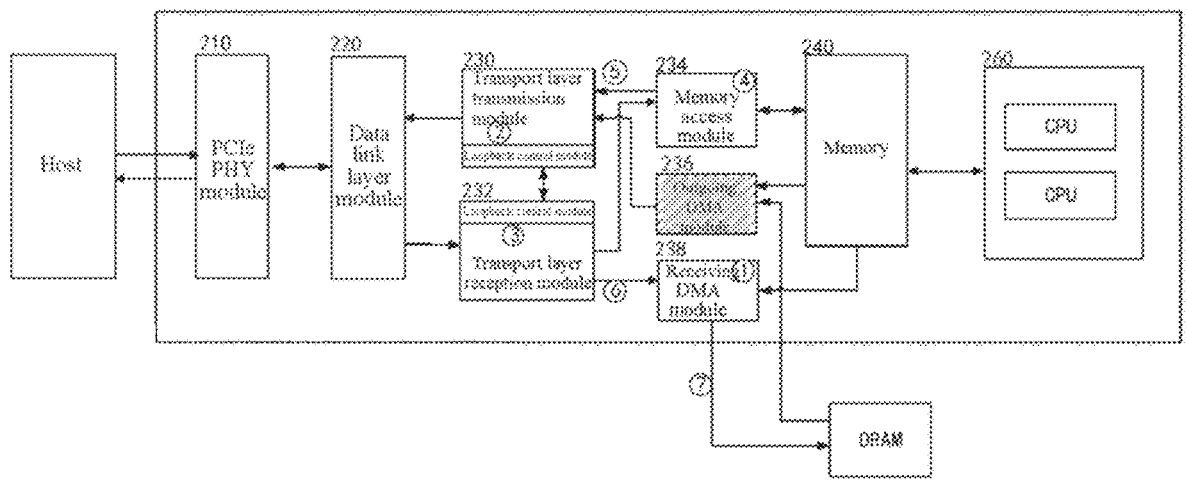
FIG. 4 is the schematic diagram of the PCIe controller "receiving" data through the loopback path according to an example of the present application.

FIG. 4 is the schematic diagram of the PCIe controller "receiving" data through the loopback path according to an example of the present application.

As an example, the example of FIG. 4 shows the process of the PCIe controller obtaining data from the memory 240 and storing the data in the destination storage space in DRAM. From the perspective of the receiving DMA module 238, the process of initiating the data "receiving" by the receiving DMA module 238 is to "receive" data from the storage space of the remote device (such as host or PCIe device), and store the received data in DRAM; although the received data appears to come from the remote device, the data is actually stored in the memory 240.

In order to receive data, the CPU sub-system 260 generates the DMA command, and fills the memory 240. The receiving DMA module 238 polls the memory 240, and promptly finds and obtains the DMA command to be processed (indicated by ①). The DMA command indicates the destination address located in DRAM and the source address located in the remote end. As an example, from the perspective of the receiving DMA module 238, the source address is the address (seems) in the remote device (for example, it seems the host or the remote PCIe device).

The receiving DMA module 238 sends the data access request to the (appearing) remote device via the transport layer transmission module 230 according to the instruction of the DMA command (indicated by ②).

The transport layer transmission module 230 identifies that the destination address is mapped to the transport layer reception module 232 according to the received destination address, so that the transport layer transmission module 230 through the loopback path to use its own loopback control module to transmit data and address to the loopback control module of the transport layer reception module 232 (indicated by ③).

The transport layer reception module 232 accesses the memory 240 via the memory access module 234, according to the received destination address to obtain the data to be accessed (indicated by ④). The memory access module receives accessed data from the memory 240 (still indicated by ④).

The memory access module 234 returns the memory access result to the (appearing) remote device via the transport layer transmission module 230. The transport layer transmission module 230 based on the source address to return the memory access result, identifies the loopback control module which is intended to send the memory access result to the transport layer reception module 232 through the loopback path (indicated by ⑤). The transport layer reception module 232 receives the memory access result, and provides the memory access result to the receiving DMA module 238 (indicated by ⑥). Optionally, the transport layer transmission module 230 encapsulates the memory access result as the TLP, and the transport layer reception module 232 receives the TLP from the loopback path and parses the TLP to and identify it as the memory access result. Still optionally, the loopback control module of the transport layer transmission module 230 and the loopback control module of the transport layer reception module 232 transmit data and/or address according to the self-defined protocol.

The receiving DMA module 238 writes the memory access result to DRAM (indicated by ⑦). Therefore, the process of obtaining data from the memory 240 and storing it in the destination storage space located in DRAM is completed.

In an alternative embodiment, after the memory access module 234 obtains the memory access result from the memory 240 (indicated by ④), it recognizes that the memory access result should be submitted to the transport layer reception module 232 according to the source address. Next, the transport layer reception module 232 provides the memory access result to the receiving DMA module 238 (indicated by ⑥). The receiving DMA module 238 writes the memory access result to DRAM (indicated by ⑦). Therefore, the process of obtaining data from the memory 240 and storing it in the destination storage space located in DRAM is completed.

Optionally, the receiving DMA module 238 further generates the DMA command execution result in response to writing data to DRAM. The receiving DMA module 238 updates the DMA command in the memory 240 according to the DMA command execution result, or writes the DMA command execution result to the memory 240 to indicate completion of the DMA command execution to the CPU sub-system 260.

In the example of FIG. 4, the process of "receiving" data through the loopback path does not use the outgoing DMA module 236, which is marked with the shade.

Figure 5:
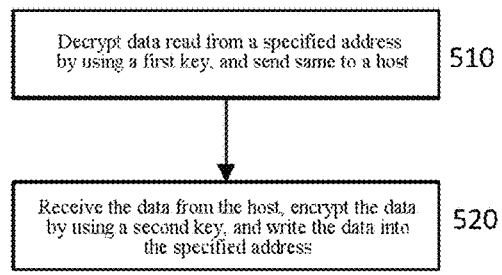
FIG. 5 is the flowchart of updating the key according to an example of the present application.

FIG. 5 is the flowchart of updating the key according to an example of the present application.

A solid-state storage device supports data encryption, encrypts the data written by the user, and writes the encrypted data to the NVM chip of the solid-state storage device. The use's key to encrypt data is recorded in the solid-state storage device. The solid-state storage device can record multiple sets of keys, and the user can specify which set of keys is used by the solid-state storage device for encrypting/decrypting data.

In some cases, the user wants to change the key used. Through the host, the user instructs, the solid-state storage device to read the data in the specified address of the solid-state storage device with the original key (510). The data is transmitted to the host. The host then instructs the solid-state storage device to write the read data to the specified address by using the new key (520). Thus, the key can be changed. Optionally, the host sets the new key to be used for the solid-state storage device between step 510 and step 520.

Moreover, according to the local loopback function in the example of the present application, the key change is completed inside the solid-state storage device without transmitting data to the host.

Figure 6A:
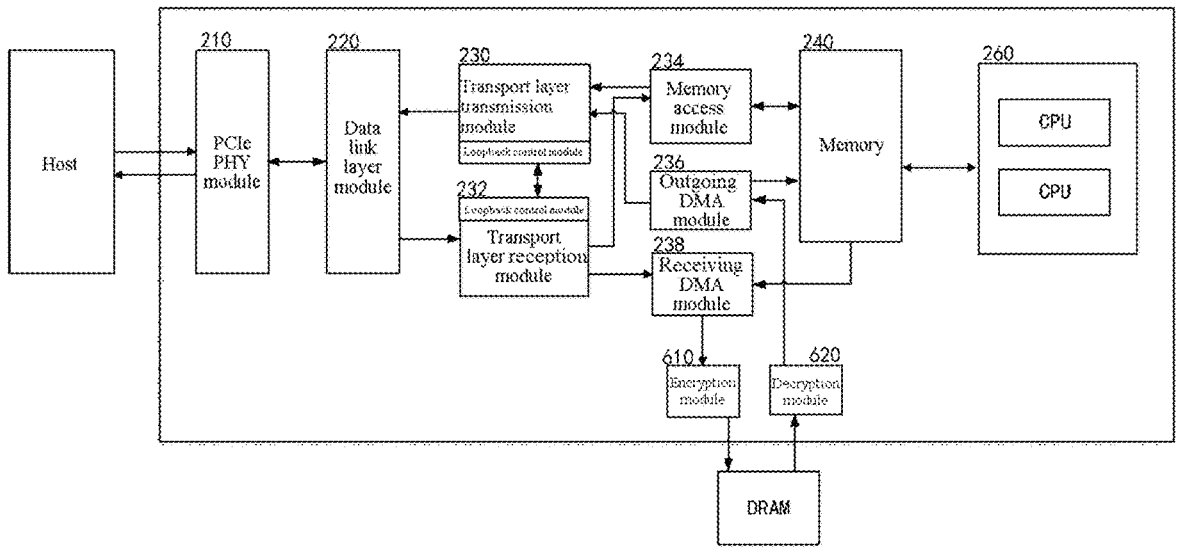
FIG. 6A shows the block diagram of the PCIe controller according to another example of the present application.

FIG. 6A shows the block diagram of the PCIe controller according to another example of the present application.

On the basis of the PCIe controller according to the example shown in FIG. 2A, the PCIe controller according to the example shown in FIG. 6A further includes the encryption module 610 and the decryption module 620.

The encryption module 610 is coupled to the receiving DMA module 238 for encrypting data written into the DRAM by the receiving DMA module 238. The decryption module 620 is coupled to the outgoing DMA module 236 for decrypting data read from the DRAM by the outgoing DMA module 236. It can be understood that, in an alternative embodiment, the encryption module 610 and the decryption module 620 can be integrated into the DMA module (including the outgoing DMA module 236 and the receiving DMA module 238), or inserted into the DMA module and the transport layer transmission module 230/the transport layer reception module 232.

According to the example of FIG. 6A of the present application, the solid-state storage device provides the function of updating the key inside the solid-state storage device. As an example, the solid-state storage device supports the key update command, the host sends the key update command to the solid-state storage device, indicating the new password to be used, and the storage address of data of the key is to be updated. As an example, the CPU sub-system 260 identifies the key update command, and in response to the key update command, the CPU sub-system 260 controls the solid-state storage device to read the data encrypted by using the old key from the storage address, and caches the encrypted data in, for example, DRAM. Next, the CPU sub-system 260 sends the encrypted data in the DRAM to, for example, the memory 240 through the local loopback path, and decrypts the data by using the old key during the data transmission from the DRAM to the memory 240, to simulate the process of decrypting and sending data to the host in step 510 in FIG. 5. Next, the CPU sub-system 260 transmits the data in the memory 240 to the DRAM through the local loopback path, and encrypts the data by using the new key. Moreover, the CPU sub-system 260 also writes the data encrypted by using the new key in DRAM to the NVM chip at the specified address of the solid-state storage device, to simulate the process of writing the data encrypted by using the new key to the specified address in step 520 in FIG. 5.

Figure 6B:
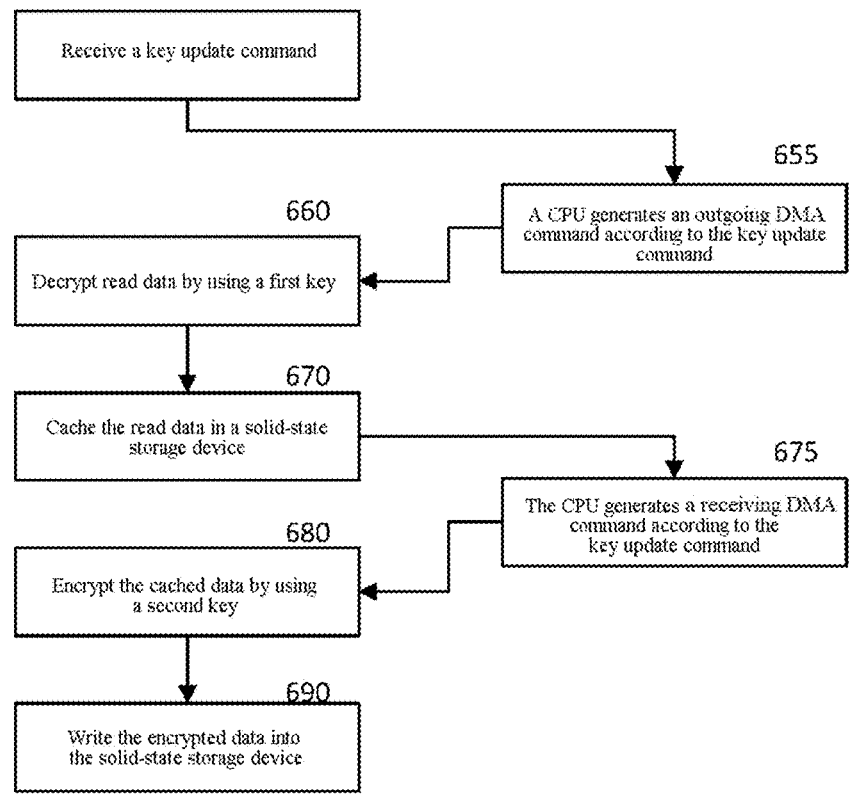
FIG. 6B is the flowchart of updating the data key according to an example of the present application.

FIG. 6B is the flowchart of updating the data key according to an example of the present application.

The solid-state storage device receives the key update command issued by the host (650). The key update command indicates the new key to be used and the storage address of the data of the key is to be updated. The storage address is, for example, the logical address of the solid-state storage device, or the physical address provided by the solid-state storage device for the user.

A CPU sub-system 260 (also see FIG. 6A) identifies and processes the key update command. The CPU sub-system 260 reads data from the NVM chip of the solid-state storage device according to the storage address indicated by the key update command, and caches the data in, for example, DRAM. As an example, in this case, the data cached in DRAM is cipher text data encrypted by using the old key. Next, the CPU sub-system 260 generates the DMA command (C1) (655) according to the key update command, to simulate the process of sending the cipher text data to the remote device (such as host), and during the data transmission process, use the old key to decrypt the cipher text data, to obtain plaintext data before encryption. The source address of the DMA command is the address of the cipher text data in DRAM, and the destination address is the address of the simulated remote device. Optionally, the CPU sub-system 260 adds the DMA command to the memory 240.

The outgoing DMA module 236 obtains the DMA command from the memory 240 and obtains the cipher text data from DRAM according to the DMA command, and the decryption module 620 decrypts the cipher text data to obtain the plaintext data (660). The outgoing DMA module 236 instructs the transport layer transmission module 230 to send the plaintext data to the destination address (the simulated remote device address) of the DMA command.

According to the destination address of the DMA command, the transport layer transmission module 230 through the loopback path, writes the plaintext data to the memory 240 via the transport layer reception module 232 and the memory access module 234 (670). Optionally, the memory access module 234 can also write the plaintext data to DRAM.

The outgoing DMA module 236 indicates the completion of the DMA command (C1) processing to the CPU sub-system.

Next, in response to completion of the DMA command (C1) processing, the CPU sub-system 260 generates another DMA command (C2) (675) to simulate the retrieval of the plaintext data from the remote device back to DRAM, and during the data transmission process, the plaintext data is encrypted by using the new key indicated by the key update command. The source address of the DMA command (C2) is the simulated remote device address (the plaintext data to be mapped to the memory 240 by the transport layer transmission module 230), and the destination address is the address in DRAM. Optionally, the CPU sub-system 260 adds the DMA command (C2) to the memory 240.

A receiving DMA module 238 obtains the DMA command (C2) from the memory 240, and sends the memory access request to the simulated remote device address via the transport layer transmission module 230 according to the DMA command (C2). The transport layer transmission module 230 will obtains the plaintext data from the memory 240 via the transport layer reception module 232 and the memory access module 234 through the loopback path according to the simulated remote device address, and the transport layer reception module 232 sends the plaintext data to the receiving DMA module 238, and the encryption module 610 encrypts the plaintext data by using the new key indicated by the key update command for the plaintext data and stores the cipher text data in DRAM (680).

Next, the receiving DMA module 238 instructs the completion of the DMA command (C2) processing to the CPU sub-system 260. Then, the CPU sub-system 260 writes the data encrypted by using the new key in DRAM to the NVM chip of the solid-state storage device according to the storage address indicated by the key update command (690). The CPU sub-system 260 also indicates the completion of the key update command processing to the host. Optionally, after writing the cipher text data encrypted by using the new key to DRAM, the CPU sub-system 260 indicates the completion of the key update command processing to the host, so as to reduce the processing delay of the key update command experienced by the user.

Figure 7:
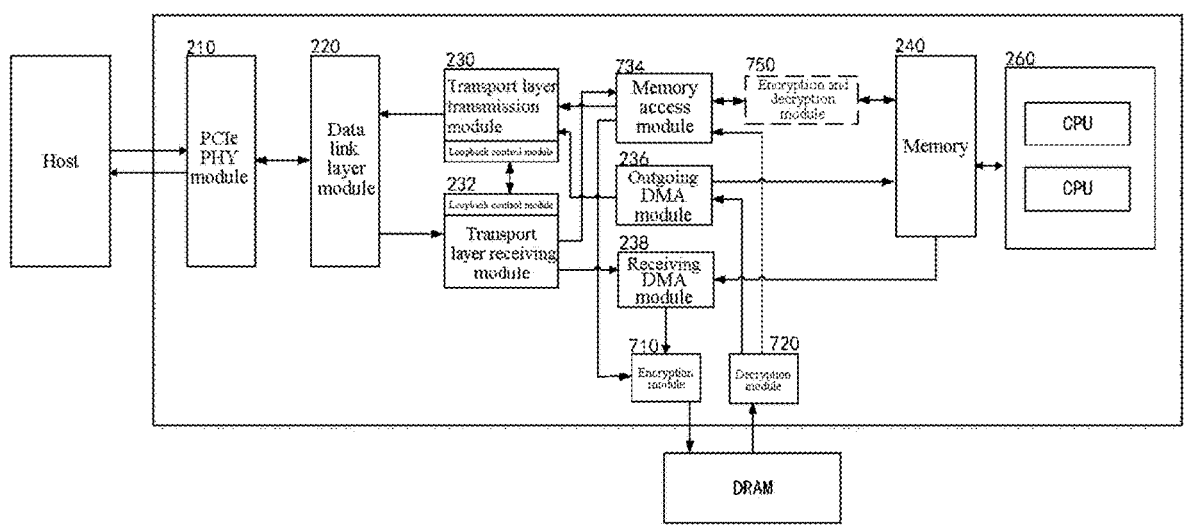
FIG. 7 shows the block diagram of the PCIe controller according to another example of the present application.

FIG. 7 shows the block diagram of the PCIe controller according to yet another example of the present application.

According to the PCIe controller of the example shown in FIG. 7, on the basis of the PCIe controller according to the example shown in FIG. 6A, the memory access module 734 is separately coupled to the encryption module 710 and the decryption module 720; and the memory access module 734 is also coupled to the encryption and decryption module 750.

The encryption module 710 is coupled to the receiving DMA module 238 for encrypting data written into DRAM by the receiving DMA module 238. The decryption module 720 is coupled to the outgoing DMA module 236 for decrypting data read from DRAM by the outgoing DMA module 236. It can be understood that, in an alternative embodiment, the encryption module 710 and the decryption module 720 can be integrated into the DMA module (including the outgoing DMA module 236 and the receiving DMA module 238), or inserted into the DMA module and the transport layer transmission module 230/the transport layer reception module 232.

In addition, the encryption module 710 is coupled to the memory access module 734 for encrypting data written into the DRAM by the memory access module 734. The decryption module 720 is coupled to the memory access module 734 for decrypting data read from DRAM by the memory access module 734. It can be understood that the encryption module 710 and the decryption module 720 can be integrated on the memory access module 734.

The encryption and decryption module 750 encrypts or decrypts the data from the memory access module 734, and stores the result of the encryption or decryption in the memory 240. The encryption and decryption module 750 encrypts or decrypts the data from the memory 240, and provides the result of encryption or decryption to the memory access module 734.

According to the example of FIG. 7 of the present application, the solid-state storage device provides the key update function inside the solid-state storage device. As an example, the solid-state storage device supports the key update command. The host sends the key update command to the solid-state storage device, indicating the new password to be used, and the storage address of the data of the key to be updated. As an example, the CPU sub-system 260 identifies the key update command, and in response to the key update command, the CPU sub-system 260 controls the data read by the solid-state storage device from the storage address, and the read data is the data encrypted by using the old key. The read data is cached, for example, in DRAM. Next, the CPU sub-system 260 generates, for example, the outgoing DMA command, to send the encrypted data in DRAM to, for example, the memory 240 through the local loopback path, and in the data transmission process from the DRAM to the memory 240, the encrypted data is decrypted by using the old key and encrypted by using the new key. Moreover, the CPU sub-system 260 also writes the data encrypted by using the new key in the memory 240 to the NVM chip at the specified address of the solid-state storage device.

As another example, in response to the key update command, the CPU sub-system 260 controls the solid-state storage device to read data from the storage address, and the read data is data encrypted by using the old key. The read data is cached, for example, in the memory 240. The CPU sub-system 260 generates, for example, the receiving DMA command, to send the encrypted data in the memory 240 to, for example, DRAM through the local loopback path, and in the process of data transmission from the memory 240 to DRAM, the encrypted data is decrypted by using the old key, and encrypted by using the new key. Moreover, the CPU sub-system 260 also writes the data encrypted by using the new key in DRAM to the NVM chip at the specified address of the solid-state storage device.

Figure 8A:
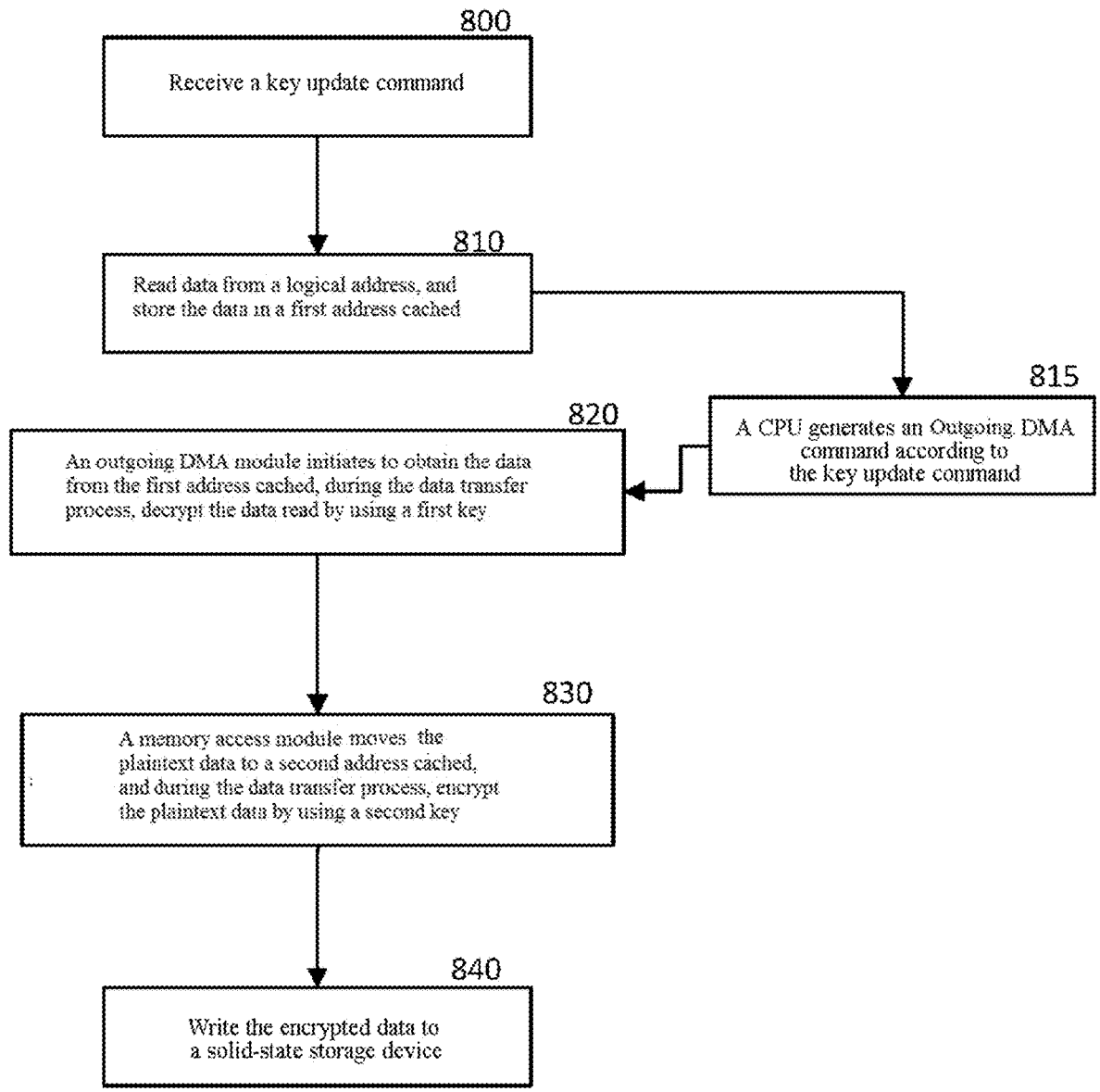
FIG. 8A is the flowchart of updating the data key according to another example of the present application.

FIG. 8A is the flowchart of updating the data key according to another example of the present application.

The solid-state storage device receives the key update command issued by the host (800). The key update command indicates the new key to be used and the logical address of the data of the key is to be updated. The CPU sub-system 260 (also see FIG. 7) identifies and processes the key update command, reads data from the logical address, and stores the data in the cached first address (810). The first address can be located in DRAM of the solid-state storage device.

As an example, in this case, the data cached at the first address of DRAM is cipher text data encrypted by using the old key. Next, the CPU sub-system 260 generates the outgoing DMA command according to the key update command (815), to simulate the process of sending the cipher text data to the remote device (such as the host). The real destination for data transmission is DRAM or the memory 240, and in the process of data transmission, the cipher text data is decrypted by using the old key to obtain plaintext data before encryption, and the plaintext data is encrypted by using the new key indicated by the key update command to obtain new cipher text data. The source address of the DMA command is the address of the cipher text data in DRAM, and the destination address is the address of the simulated remote device. The simulated remote device address is mapped to DRAM or memory 240 by the loopback control module of the outgoing DMA module 236 (second address).

The outgoing DMA module 236 obtains the DMA command from the memory 240 and obtains the cipher text data from DRAM according to the DMA command, and the decryption module 720 decrypts the cipher text data to obtain the plaintext data (820). The outgoing DMA module 236 instructs the transport layer transmission module 230 to send the plaintext data to the destination address of the DMA command (simulated remote device address).

In one example, the simulated remote device is mapped to DRAM. According to the destination address of the DMA command, the transport layer transmission module 230 encrypts the plaintext data by using the new key through the loopback path, through the transport layer reception module 232, the memory access module 734, and through the encryption module 710. Write the encrypted data to DRAM (830).

In one example, the simulated remote device is mapped to the memory 240. According to the destination address of the DMA command, the transport layer transmission module 230 encrypts the plaintext data by using the new key through the loopback path, through the transport layer reception module 232, the memory access module 734, through the encryption and decryption module 750, the encrypted data is written to the memory 240 (830).

In response to the completion of the processing of the outgoing DMA command, the CPU sub-system 260 also writes the data in the second address (in DRAM or memory 240) encrypted by using the new key stored to the logical address of the solid-state storage device, to complete the key update command processing (840).

Figure 8B:
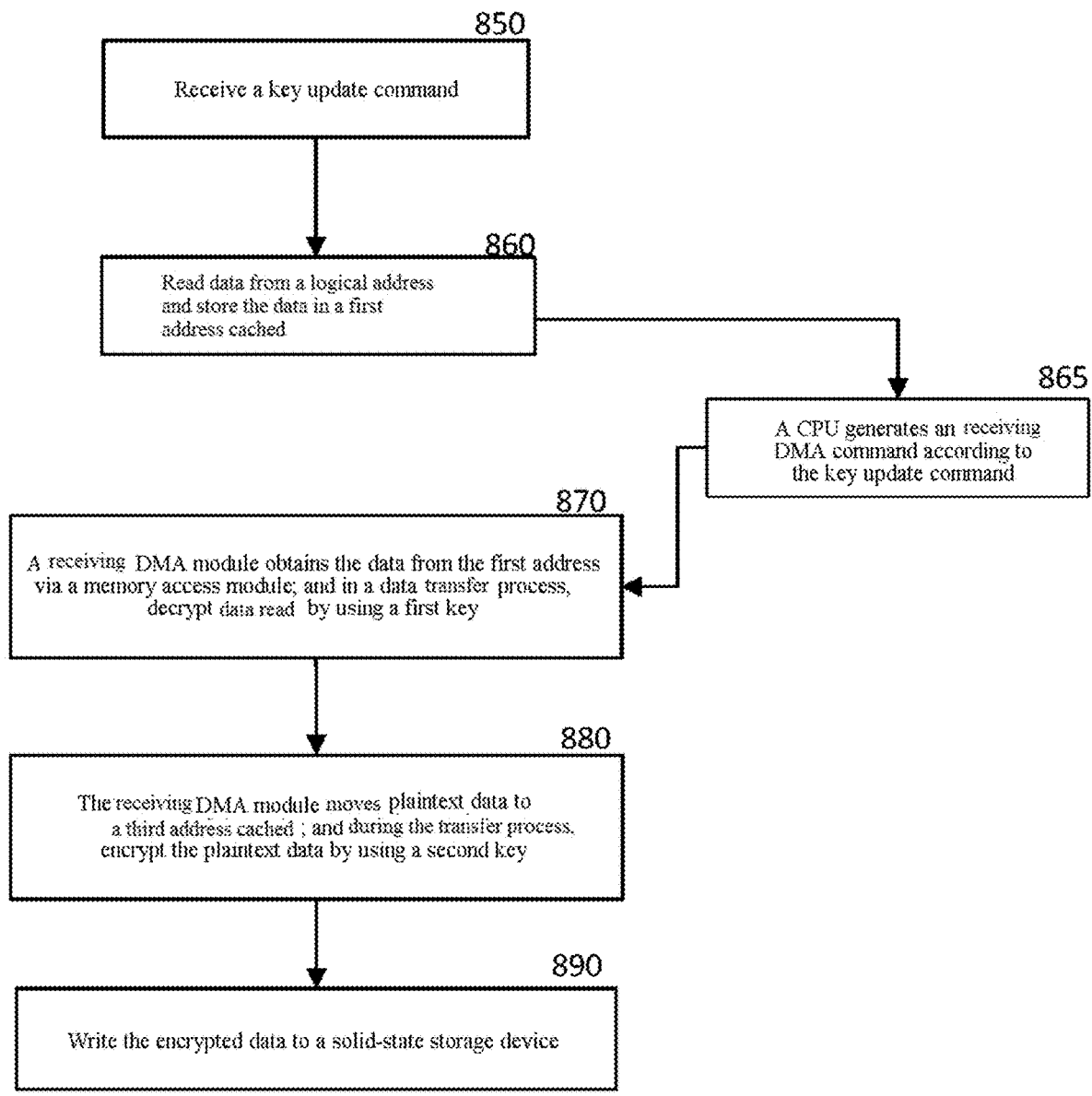
FIG. 8B is the flowchart of updating the data key according to still another example of the present application.

FIG. 8B is the flowchart of updating the data key according to still another example of the present application.

The solid-state storage device receives the key update command issued by the host (850). The key update command indicates the new key to be used and the logical address of the data of the key is to be updated. The CPU sub-system 260 (also see FIG. 7) identifies and processes the key update command, reads data from the logical address, and stores the data at the cached first address (860). The first address is located in the memory 240 or DRAM of the solid-state storage device.

In one example, the first address is located in the memory 240. In this case, the data cached at the first address of the memory 240 is cipher text data encrypted by using the old key. Next, the CPU sub-system 260 generates the receiving DMA command according to the key update command (865), to simulate the process of transmitting the cipher text data from the remote device (such as host) to DRAM. The real purpose of data transmission is DRAM, and in the data transmission process, the cipher text data is decrypted by using the old key to obtain plaintext data before encryption, and the plaintext data is encrypted by using the new key indicated by the key update command to obtain the new cipher text data. The source address of the DMA command is the simulated remote device address (the address of the cipher text data in the memory 240), and the destination address is the address in DRAM (second address). The simulated remote device address is mapped to the memory 240 by the loopback control module of the receiving DMA module 238 (first address).

The receiving DMA module 236 obtains the DMA command from the memory 240, and sends the DMA transmission from the simulated remote device address to the destination address via the transport layer transmission module according to the DMA command. The transport layer transmission module 230 according to the destination address, through the loopback path, through the transport layer reception module 232, the memory access module 734, through the encryption and decryption module 750, obtains the cipher text data from the first address of the memory 240 and decrypts the cipher text data by using the old key (870).

In another example, the first address is located in DRAM. In this case, the data cached at the first address of the memory 240 is cipher text data encrypted by using the old key. Next, the CPU sub-system 260 generates the receiving DMA command according to the key update command (865), to simulate the process of transmitting the cipher text data to the remote device (such as host) to DRAM. The real purpose of data transmission is DRAM. The source address of the DMA command is the simulated remote device address (the first address of the cipher text data in DRAM), and the destination address is the address in DRAM (second address). The simulated remote device address is mapped to DRAM by the loopback control module of the receiving DMA module 238 (first address). The receiving DMA module 238 obtains the DMA command from the memory 240, and sends the DMA transmission from the simulated remote device address to the destination address via the transport layer transmission module according to the DMA command. The transport layer transmission module 230 according to the destination address, through the loopback path, via the transport layer reception module 232 and the memory access module 734, and through the decryption module 720, obtains the cipher text data from the first address of DRAM and decrypts the cipher text data by using the old key (870).

The memory access module 734 sends the decrypted plaintext data to the transport layer reception module 232 via the loopback control module of the transport layer transmission module 230. The transport layer reception module 232 provides the plaintext data to the encryption module 710 by the receiving DMA module 238. The encryption module 710 encrypts the plaintext data by using the new key, and stores the encrypted data in DRAM (second address) (880).

In response to the completion of the processing of the outgoing DMA command, the CPU sub-system 260 also writes the data encrypted by using the new key stored in the second address (in DRAM) to the logical address of the solid-state storage device, to complete the processing of the key update command (890).

The example of the present application further provides the program including program codes, wherein when the program is loaded into the CPU and executed in the CPU, the program cause the CPU to perform one of the methods according to the examples of the present application provided above.

Although examples referred to in the current invention are described, they are only for the purpose of explanation and not to limit the present application, and changes, additions, and/or deletions to the embodiments may be made without departing from the scope of the present application.

Persons skilled in the art are involved in these embodiments and benefit from the teachings presented above and associated drawings will recognize many modifications and other embodiments of the application described herein. Therefore, it should be understood that the present application is not limited to the disclosed specific embodiments, and is intended to incorporate modifications and other embodiments within the scope of the attached claims. Although specific terms are used herein, they are used only in general and descriptive senses and are not used for limiting purpose.

The invention claimed is:

1. A PCIe controller, comprising a transport layer transmission module, a transport layer reception module, a memory access module, an outgoing DMA module, a receiving DMA module, an encryption module, a decryption module, and a memory; wherein the transport layer transmission module comprises a first loopback control module, the transport layer reception module comprises a second loopback control module, and the first loopback control module is coupled to the second loopback control module; the memory access module is coupled to the transport layer transmission module and the transport layer reception module, and the memory access module is further coupled to the memory; the outgoing DMA module is coupled to the decryption module, and the outgoing DMA module is also coupled to the transport layer transmission module; the receiving DMA module is coupled to the encryption module, and the receiving DMA module is also coupled to the transport layer reception module; the encryption module and the decryption module are also coupled to DRAM outside the PCIe controller, separately; and the transport layer transmission module is configured to send part of PCIe protocol TLP to the second loopback control module of the transport layer reception module via the first loopback control module, wherein the decryption module is configured to decrypt the data obtained from the DRAM, and provide the decrypted data to the outgoing DMA module, the first loopback control module sends parts of TLPs to the second loopback control module, the first loopback control module sends the TLPs with the specified identifier and/or the TLPs accessing the specified address space to the second loopback control module, and the second loopback control module sends the TLP received by the first loopback control module to the memory access module or the receiving DMA module.

2. The PCIe controller according to claim 1, wherein the encryption module is configured to encrypt the data provided by the receiving DMA module, and provide the encrypted data to the DRAM.

3. The PCIe controller according to claim 1, wherein part of memory access results sent by the memory access module to the transport layer transmission module is forwarded to the transport layer reception module by the first loopback control module.

4. The PCIe controller according to claim 3, wherein the outgoing DMA module obtains the DMA command from the memory, and according to the DMA command transmits specified data in the memory or in DRAM coupled to the PCIe controller to the specified address.

5. A method for updating a data key, comprising:
receiving a key update command;

generating an outgoing DMA command according to the key update command;

decrypting a cipher text data by using a first key to obtain a plaintext data;

caching the plaintext data in a solid-state storage device through a loopback path;

in response to a completion of an outgoing DMA command processing, generating a receiving DMA command;

encrypting the plaintext data cached by using a second key; and writing the encrypted data into the solid-state storage device.

6. The method according to claim 5, wherein indicating, by the key update command, the new key to be used and the storage address of data of the key to be updated;

the method further comprising:

reading data from the NVM chip of the solid-state storage device according to the storage address indicated by the key update command, and storing the data in a first address of a cache; wherein the data stored in the first address of the cache is the cipher text data encrypted by using the first key; and transmitting the cipher text data in the first address of the cache to a second address of the cache according to the outgoing DMA command, wherein the second address of the cache stores the plaintext data.

7. The method according to claim 6, wherein in the process of transmitting the cipher text data in the first address of the cache to the second address of the cache according to the outgoing DMA command, the first key is used to decrypt the cipher text data to obtain the plaintext data.

8. The method according to claim 7, wherein an outgoing DMA module sends the plaintext data to a transport layer transmission module; the transport layer transmission module sends the plaintext data to a second loopback control module via a first loopback control module according to the destination address of DMA transmission; and a transport layer reception module provides the plaintext data received by the second loopback control module to the cache.

9. The method according to claim 8, wherein transmitting the plaintext data in the second address of the cache to a third address of the cache according to the receiving DMA command, wherein the third address of the cache stores the cipher text data encrypted by the second key to the plaintext data.

10. The method according to claim 9, wherein a receiving DMA module requests to obtain the plaintext data in the second address of the cache; the transport layer transmission module sends the plaintext data to the second loopback control module via the first loopback control module according to the destination address of the DMA transmission; the transport layer reception module provides the plaintext data received by the second loopback control module to the receiving DMA module; and the receiving DMA module encrypts the plaintext data by using the second key to obtain the cipher text data, and stores the cipher text data in the third address of the cache.

11. A method for processing a key update command, comprising:

in response to a key update command, reading data from a logical address instructed by the key update command, and storing the data read at a first address of a cache;

initiating an outgoing DMA transmission to move the data from the first address to a second address, and during the transfer process, decrypting the data read by using an old key to obtain a plaintext data and encrypting the plaintext data by using a new key to obtain a cipher text data; and writing the cipher text data at the second address into the logical address;

wherein an outgoing DMA module sends the plaintext data to a transport layer transmission module; the transport layer transmission module sends the plaintext data to a second loopback control module via a first loopback control module according to the destination address of the DMA transmission; a transport layer reception module provides the plaintext data received by the second loopback control module to a memory access module; and the memory access module stores the cipher text data in the second address of the cache.

12. The method according to claim 11, wherein: the receiving DMA module requests to obtain the cipher text data in the first address of the cache via the transport layer transmission module; the transport layer transmission module sends the request to the second loopback control module via the first loopback control module according to the source address of the DMA transmission; the transport layer reception module provides the request received by the second loopback control module to the memory access module; the memory access module obtains the cipher text data from the first address of the cache, and provides the plaintext data decrypted by using the first key to the transport layer transmission module; the transport layer transmission module sends the request to the second loopback control module via the first loopback control module according to the destination address of the DMA transmission; the transport layer reception module provides the plaintext data received by the second loopback control module to the receiving DMA module; and the receiving DMA module encrypts the plaintext data by using the second key to obtain the cipher text data, and stores the cipher text data to the second address of the cache.

13. A PCIe controller, comprising a transport layer transmission module, a transport layer reception module, a memory access module, an outgoing DMA module, a receiving DMA module, an encryption module, a decryption module, and a memory; wherein the transport layer transmission module comprises a first loopback control module, the transport layer reception module comprises a second loopback control module, and the first loopback control module is coupled to the second loopback control module; the memory access module is coupled to the transport layer transmission module and the transport layer reception module, and the memory access module is further coupled to the memory; the outgoing DMA module is coupled to the decryption module, and the outgoing DMA module is also coupled to the transport layer transmission module; the receiving DMA module is coupled to the encryption module, and the receiving DMA module is also coupled to the transport layer reception module; and the encryption module and the decryption module are also coupled to DRAM outside the PCIe controller, separately, wherein the decryption module is configured to decrypt the data obtained from the DRAM, and provide the decrypted data to the outgoing DMA module, the first loopback control module sends parts of TLPs to the second loopback control module, the first loopback control module sends the TLPs with the specified identifier and/or the TLPs accessing the specified address space to the second loopback control module, and the second loopback control module sends the TLP received by the first loopback control module to the memory access module or the receiving DMA module.

14. The PCIe controller according to claim 13, wherein the encryption module is configured to encrypt the data provided by the receiving DMA module, and provide the encrypted data to the DRAM.

15. The PCIe controller according to claim 13, wherein part of memory access results sent by the memory access module to the transport layer transmission module is forwarded to the transport layer reception module by the first loopback control module.

16. The PCIe controller according to claim 15, wherein the outgoing DMA module obtains the DMA command from the memory, and according to the DMA command transmits specified data in the memory or in DRAM coupled to the PCIe controller to the specified address.

\* \* \* \* \*